United States Patent [19]

Urayama et al.

[11] Patent Number: 5,160,752
[45] Date of Patent: Nov. 3, 1992

[54] MOLD FOR FORMING A TAPE CASSETTE REEL

[75] Inventors: Kiyoshi Urayama; Masanori Sato, both of Miyagi, Japan

[73] Assignee: Sony Corporation, Tokyo, Japan

[21] Appl. No.: 682,970

[22] Filed: Apr. 10, 1991

Related U.S. Application Data

[62] Division of Ser. No. 447,373, Dec. 7, 1989.

[30] Foreign Application Priority Data

Dec. 28, 1988 [JP] Japan .................. 63-331332

[51] Int. Cl.⁵ .................................. B29C 45/00
[52] U.S. Cl. .................... 425/577; 249/63; 249/144; 249/162; 264/318; 425/441
[58] Field of Search ........ 425/577, 438, 441, DIG. 5, 425/DIG. 58; 249/56, 59, 63, 144, 145, 162; 264/318

[56] References Cited

U.S. PATENT DOCUMENTS

| | | | |
|---|---|---|---|
| 2,400,024 | 5/1946 | Roehrl | 425/DIG. 58 |
| 2,574,883 | 11/1951 | Medal | 242/74 |
| 3,064,917 | 11/1962 | Roberts et al. | 242/74 |
| 3,362,675 | 1/1968 | Ferdig | 425/DIG. 58 |
| 3,695,541 | 10/1972 | Lee | 242/71.8 |
| 3,843,088 | 10/1974 | McLoughlin et al. | 425/DIG. 58 |
| 4,209,160 | 6/1980 | Vanotti | 425/DIG. 5 |

FOREIGN PATENT DOCUMENTS

| | | | |
|---|---|---|---|
| 1456775 | 10/1966 | France | 425/DIG. 5 |
| 585991 | 12/1977 | U.S.S.R. | 425/DIG. 58 |

Primary Examiner—Jay H. Woo
Assistant Examiner—Scott Bushey
Attorney, Agent, or Firm—Philip M. Shaw, Jr.

[57] ABSTRACT

A tape cassette reel molding apparatus which includes upper and lower opposed molds for forming upper and lower flanges of the tape cassette reel and first and second hub molds provided between the upper and lower molds, the first and second hub molds each having an opposing face which has a semicylindrical cavity therein, at least one of the first and second hub molds being slidable in a direction parallel to the face of the upper mold and away from the other of the first and second hub molds so that when the upper and lower molds and the first and second hub molds are slid into position against each other, the respective cavities therein are all contiguous and a unitary tape cassette reel can be molded.

7 Claims, 4 Drawing Sheets

MOLD FOR FORMING A TAPE CASSETTE REEL

This is a division of application Ser. No. 07/447,373 filed Dec. 7, 1989.

BACKGROUND OF THE INVENTION

1. Field of the Invention

The present invention relates generally to tape cassette reels, and more particularly, to a tape cassette reel having a wing-type upper flange which is incorporated within a video tape cassette.

2. Description of the Prior Art

In a video tape cassette according to the prior art, a pair of tape reels are incorporated within a cassette housing and a magnetic tape is wound around the pair of tape reels in the state that the respective ends of the magnetic rape are fixed to reel hubs of the tape reels. Upper and lower flanges are formed at the respective ends of each reel hub so that the magnetic tape wrapped around the reel hub can not be moved in the width direction thereof.

In the prior-art tape cassette reel, the upper and lower flanges are independently molded, and they are integrally coupled to the reel hub by some suitable means such as welding and caulking in the assembly and manufacturing process (see Japanese Utility Model Gazette No. 57-9983).

As described above, in the tape cassette reels according to the prior art, the upper and lower flanges are separately molded so that the molding cost is unavoidably increased. Further, some process for coupling the upper and lower flanges is also required, which causes the number of assembly and manufacturing processes of the tape cassette to be increased. This leads to an increase of the manufacturing cost.

OBJECTS AND SUMMARY OF THE INVENTION

Accordingly, it is an object of the present invention to provide an improved tape cassette reel which can eliminate the defects encountered with the prior art.

More specifically, it is an object of the present invention to provide a tape cassette reel in which a wing-type upper flange and a disk-shaped lower flange can be molded together with a reel hub as one body by a novel metal molding apparatus.

It is another object of the present invention to provide a tape cassette reel which can be manufactured at low cost.

It is still another object of the present invention to provide a tape cassette reel which has a reduced material cost.

It is a further object of the present invention to provide a tape cassette reel which is suitable for use in a video tape cassette.

According to an aspect of the present invention, there is provided a tape cassette reel comprising:

(a) a reel hub;

(b) an upper flange having a wing-shaped configuration; and (c) a lower flange having a disk-shaped configuration, wherein the upper and lower flanges are molded to the reel hub as one body by using a metal molding apparatus having a slide core.

The above, and other objects, features and advantages of the present invention, will be apparent in the following detailed description of preferred embodiments when read in conjunction with the accompanying drawings, in which like reference numerals are used to identify the same or similar parts in the several views.

BRIEF DESCRIPTION OF THE DRAWINGS

The accompanying drawings show the preferred embodiments of the invention in which.

DETAILED DESCRIPTION OF PREFERRED EMBODIMENTS

The present invention will now be described in detail with reference to the drawings.

Figure 1:
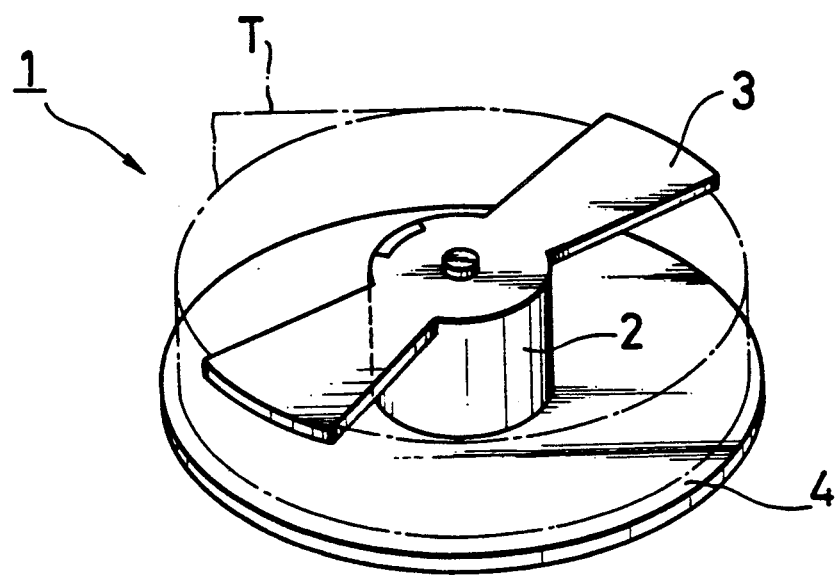
FIG. 1 is a perspective view of a tape cassette reel according to an embodiment of the present invention.
Figure 2:
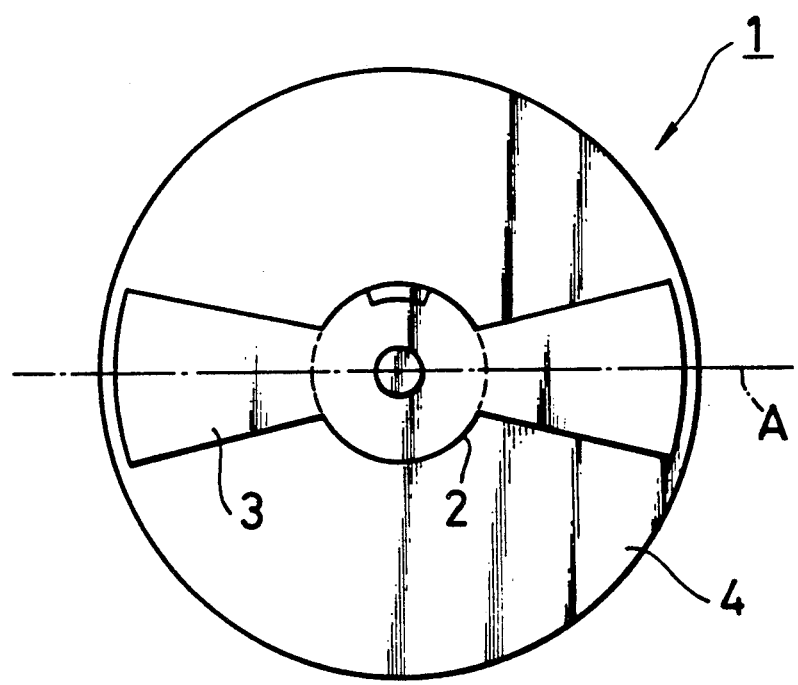
FIG. 2 is a planar view of the tape cassette reel depicted in FIG. 1.
Figure 3:
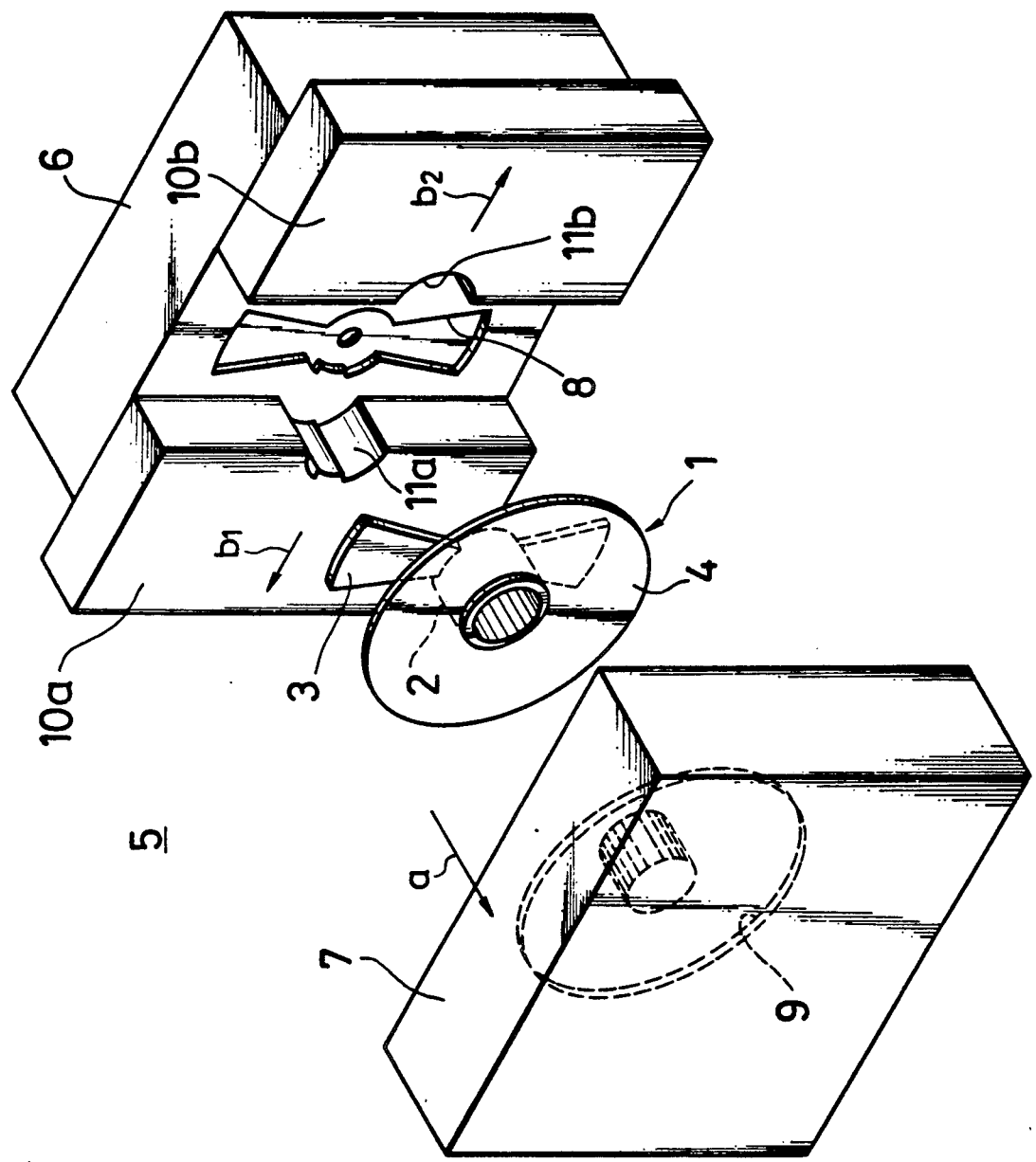
FIG. 3 is a perspective view illustrating a constitution of a metal molding apparatus for molding the tape cassette reel of the present invention.

FIGS. 1 to 3 show a first embodiment of the present invention. Throughout FIGS. 1 to 3, it will be seen that a tape cassette reel 1 is comprised of a reel hub 2 and upper and lower flanges 3 and 4. A magnetic tape T is wrapped around the peripheral surface of the reel hub 2, and the upper and lower flanges 3 and 4 are integrally formed on the respective upper and lower ends of the reel hub 2 as one body therewith.

The lower flange 4 of the tape cassette reel 1 has a disk-shape similar to a standard tape reel, and supports the whole lower winding surface of the magnetic tape T wrapped around the reel hub 2. The upper flange 3 has the configuration of a pair of unfolded fan-shaped wing-type portions. The pair of unfolded fan-shaped wing-type portions of the upper flange 3 are symmetrical with respect to a center (i.e. a diameter) line A passing through the central portion of the tape reel 1 as shown in FIG. 2. The width of each of the unfolded fan-shaped wing-type portions of the upper flange 3 is selected to be small so that it can not disturb the movement of a slide core of a metal molding apparatus which will be explained later.

Although the upper flange 3 of the invention is formed to have a wing-shape as described above, unlike the prior-art disk-shaped upper flange, the upper flange 3 can still function well because it is needed only to restrict one portion of the winding surface of the magnetic tape T so that the magnetic tape T wrapped around the reel hub 2 can not move in the upward direction as viewed in FIG. 1.

FIG. 3 illustrates the construction of a metal molding apparatus for molding the tape reel 1. It will be seen that a metal molding apparatus 5 is comprised of an upper mold core 6 and a lower mold core 7. In this embodiment, the lower mold core 7 moves in the direction shown by an arrow a away from the upper mold core 6, to open the upper mold core 6 and the lower mold core 7. An unfolded-fan-shaped concave portion 8 is formed in the upper mold core 6 to mold the upper flange 3 of the tape cassette reel 1 while a circular concave portion 9 is formed in the lower mold core 7 to mold the lower flange 4 of the tape cassette reel 1.

A slide core (movable type) for molding one half of the hub 2 is slidably provided between the upper and lower mold cores 6 and 7 so that it can move in the direction at a right angle to the direction in which the upper and lower mold cores 6 and 7 are moved to open. In this embodiment, this slide core is of a double slide type and is comprised of a pair of slide cores 10a and 10b which are opened in the opposite directions (in the directions shown by arrows b1 and b2 in FIG. 3) from the central portion. The pair of slide cores 10a and 10b are slidably moved along the upper mold core 6. Further, semicircular concave portions 11a and 11b are respectively formed on the slide cores 10a and 10b in their opposing faces so as to mold half portions of the reel hub 2 of the tape cassette reel 1.

When the molding apparatus 5 thus constructed is closed and then a resin material is injected through an injection gate (not shown) into a cavity formed by the concave portions 8 and 9 of the upper and lower mold cores 6 and 7 and the concave portions 11a and 11b of the slide cores 10a and 10b, then the tape cassette reel 1 having the upper and lower flanges 3 and 4 as one body therewith can be molded in a so-called one shot fashion.

After the molding-process, the upper and lower mold cores 6 and 7 are opened along the axial direction of the tape cassette reel 1 and the slide cores 10a and 10b are opened in the peripheral surface direction of the tape cassette reel 1 (i.e. in the directions shown by the arrows b1 and b2 in FIG. 3) thereby forming a space to remove the upper flange 3 from the upper mold core 6. Thus, the tape cassette reel 1 can be taken out from the metal molding apparatus 5.

When the tape cassette reel 1 is taken out from the metal molding apparatus 5, the upper flange 3 can be extracted from the upper mold core 6 by the short moving stroke of the slide cores 10a and 10b because the upper flange 3 has a wing-type configuration having a small width.

As described above, according to this embodiment, the tape cassette reel 1 having the upper and lower flanges 3 and 4 molded as a unitary body with the hub 2 can be molded by the use of the metal molding apparatus 5 with the slide cores 10a, 10b in a one-shot fashion. Therefore, as compared with a prior-art case where upper and lower flanges are separately molded, the molding cost of the tape cassette reel of this embodiment can be reduced. Also, since the process for connecting the upper and lower flanges to the hub 2 is not needed, it becomes possible to reduce the number of assembly and manufacturing processes. Furthermore, according to the tape cassette reel of this embodiment, the upper flange 3 is formed to have a fan-shaped wing-type configuration of small width so that, as compared with the prior-art tape cassette reel in which the upper flange is formed similarly to the disk-shaped lower flange, the tape cassette reel of this embodiment can be made using less material, which can reduce the material cost.

Further, since the shape of the upper flange 3 is wing-shaped and having small width, it is possible to reduce the moving strokes of the slide cores 10a and 10b in the metal molding apparatus 5. Therefore, the general or overall arrangement of the metal molding apparatus 5 can be made compact in size, and thus the metal molding apparatus 5 of the present invention is advantageously located in a small production line space.

Figure 4:
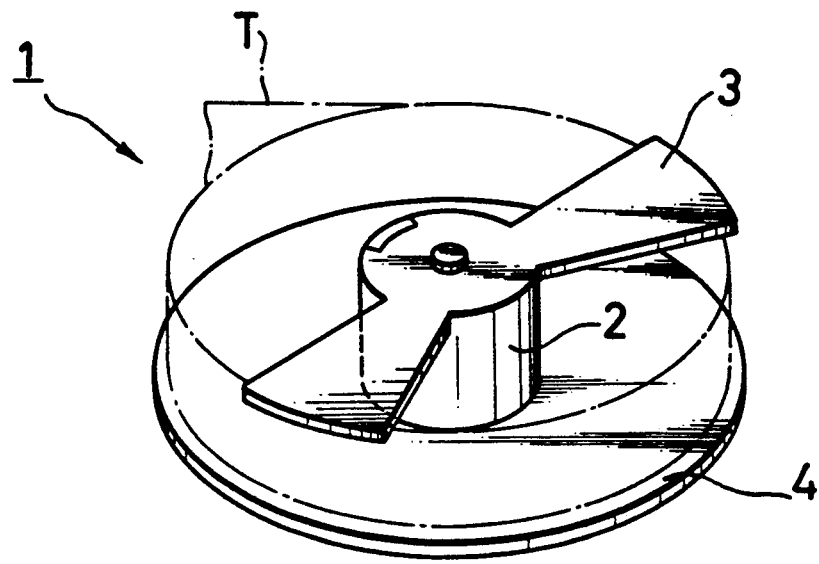
FIG. 4 is an exploded, perspective view of a tape cassette reel according to another embodiment of the present invention.
Figure 5:
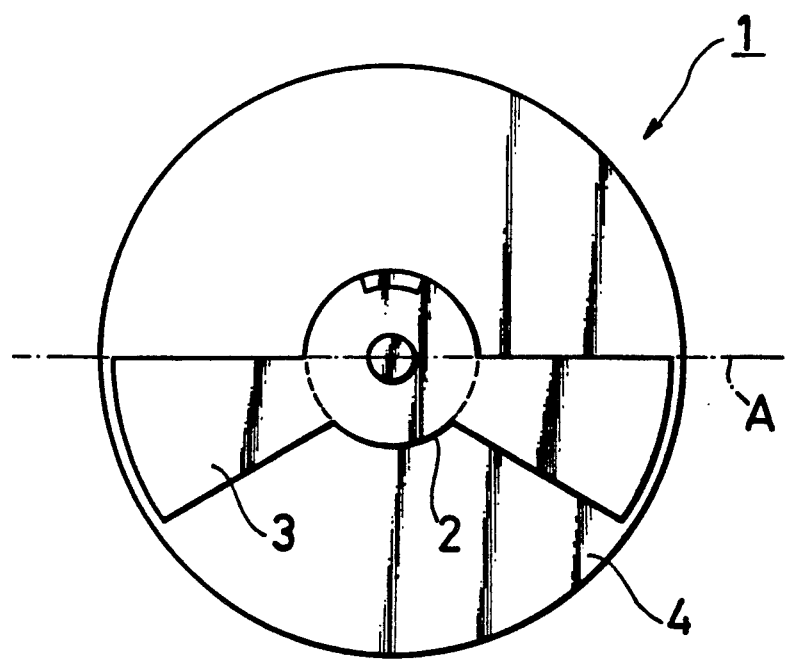
FIG. 5 is a planar view of the tape cassette reel depicted in FIG. 4.
Figure 6:
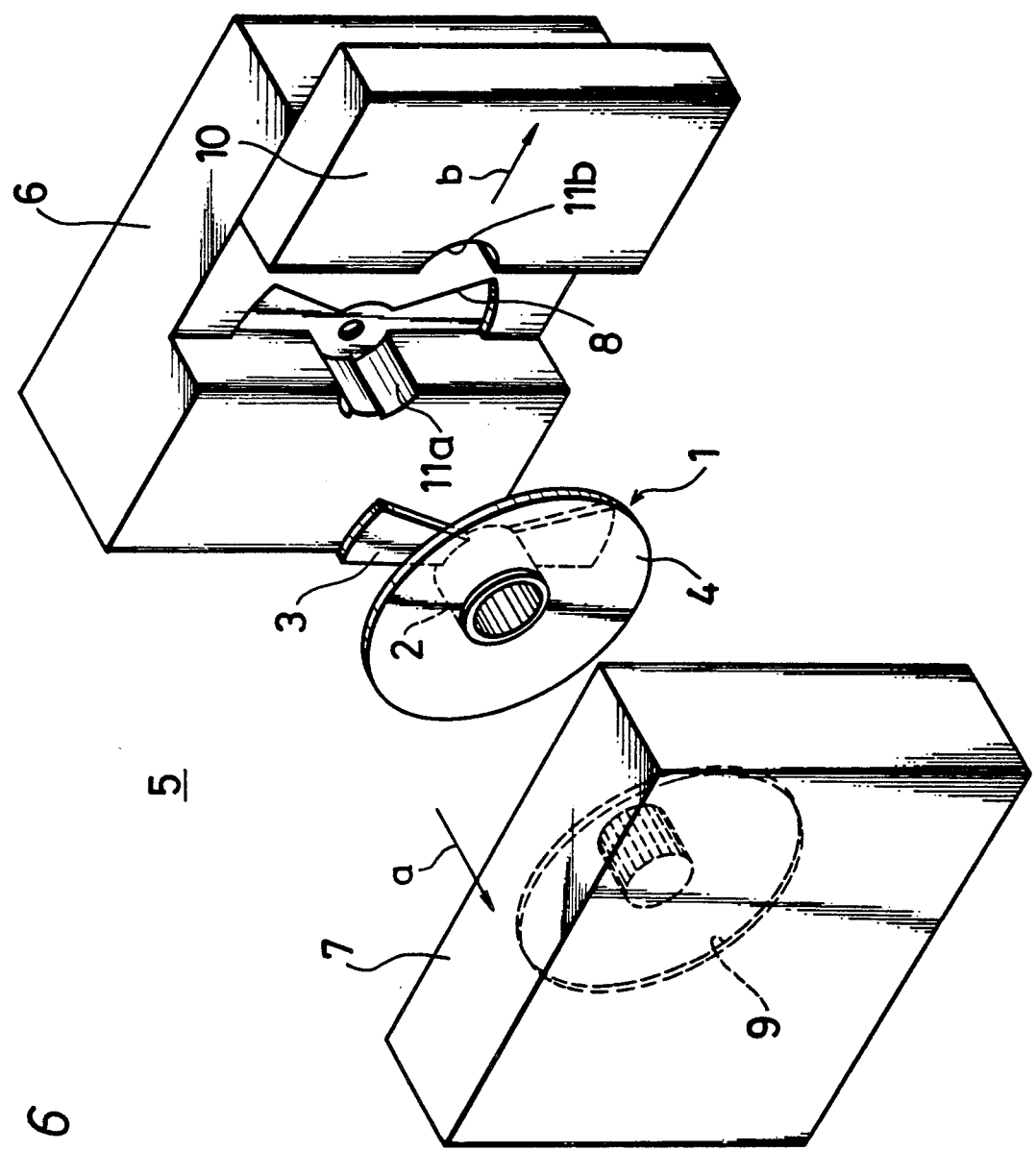
FIG. 6 is an exploded, perspective view illustrating the constitution of a metal molding apparatus for molding the tape cassette reel of the present invention.

FIGS. 4 to 6 show a second embodiment of the present invention of a tape cassette reel 1 molded by a metal molding apparatus 5 of the single slide type. In FIGS. 4 to 6, like parts corresponding to those of FIGS. 1 to 3 are marked with the same reference numerals and therefore need not be described in detail.

As clearly shown in FIG. 5, the upper flange 3 is molded to have an asymmetrical shape from its metal mold structure standpoint. More specifically, the upper flange 3 of the tape cassette reel 1 of this embodiment is formed only on one half side of the center line (i.e. diameter) A passing through the central portion of the tape cassette reel 1. Although the upper flange 3 is formed at the asymmetrical position, the upper flange 3 can regulate the upper winding surface of the magnetic tape T wrapped around the reel hub 2 with similar action and effects to those of the first embodiment being achieved. Further, this upper flange 3 does not cause any trouble from a rotation characteristic standpoint of the tape cassette reel 1.

According to this embodiment, as shown in FIG. 6, the metal molding apparatus 5 is provided with a single slide core 10 for molding the hub 2. This slide core 10 is made slidable in the direction shown by an arrow b from the central portion of the upper mold core 6 to open. The concave portion 11a for molding one half portion of the reel hub 2 is formed in the face of a stepped, upper mold core 6 as a continuation of the concave portion 8 where the upper flange 3 of the tape cassette reel 1 is molded. In correspondence therewith, the slide core 10 is provided with the concave portion 11b which molds the remaining half portion of the reel hub 2.

In the second embodiment utilizing the metal molding apparatus 5 in which the slide core is formed as the single slide type, as compared with that of the first embodiment, the metal mold structure is very simple, whereby the metal mold can be produced and maintained with ease. Further, the mechanism for slidably moving the slide core can be simplified, whereby the overall arrangement of the metal molding apparatus can be made more compact in size. Accordingly, many more metal molding apparatus than those of the first embodiment can be located in a small production line space, whereby many more tape cassette reels can be produced. Thus, the efficiency of production can be increased.

As set forth above, according to the present invention, the upper and lower flanges are formed as one body with the reel hub by use of a metal molding apparatus having a slide core so that, as compared with the prior art in which the upper and lower flanges are separately formed, the molding cost can be reduced. Further, since the process for coupling the upper and lower flanges is not needed, it is possible to reduce the number of steps in the manufacturing-process. In addition, since the upper flange is formed as the unfolded-fan-shaped wing-type, the material cost can be reduced. Thus, the tape cassette reel of this invention can be manufactured at low cost.

Having described preferred embodiments of the invention in detail with reference to the accompanying drawings, it is to be understood that the present invention is not limited to those embodiments and that many changes and modifications could be effected by one skilled in the art without departing from the spirit and scope of the invention as defined in the appended claims.

We claim as our invention:

1. An apparatus for molding a tape cassette reel having upper and lower flanges and a hub connected between the upper and lower flanges, the molding apparatus comprising:
   (a) an upper mold having a face with a cavity therein for molding the upper flange;
   (b) a lower mold having a face with a disc shaped cavity therein for molding the lower flange, the upper and lower molds being oriented during the molding process so that their faces with the respective cavities are opposed to each other and the lower mold being selectively slidable in a direction perpendicularly away from the face of the upper mold;
   (c) first and second hub molds provided between the upper and lower molds, the first and second hub molds each having an opposing face which has a semicylindrical cavity therein, at least one of the first and second hub molds being slidable in a direction parallel to the face of the upper mold and away from the other of the first and second hub molds; and
   (d) wherein when the upper and lower molds and the first and second hub molds are slid into position against each other, the respective cavities therein are all contiguous whereby a unitary tape cassette reel can be molded.

2. An apparatus for molding a tape cassette reel as recited in claim 1 wherein the cavity in the face of the upper mold has a configuration of a pair of unfolded fan-shaped wing-type portions.

3. An apparatus for molding a tape cassette reel as recited in claim 2 wherein the cavity in the face of the upper mold is symmetrically aligned with respect to a hypothetical line across the diameter of the cavity in the face of the lower mold.

4. An apparatus for molding a tape cassette reel as recited in claim 3 wherein the first and second hub molds are both slidable in opposite directions parallel to the face of the upper mold to open the molding apparatus.

5. A tape cassette reel according to claim 4, wherein the opposite directions in which the first and second hub molds are movable is a direction at a right angle to the axial direction of the tape cassette reel to open and close the molding apparatus.

6. An apparatus for molding a tape cassette reel as recited in claim 2 wherein the cavity in the face of the upper mold is asymmetrically aligned with respect to a hypothetical line across the diameter of the cavity in the face of the lower mold.

7. An apparatus for molding a tape cassette reel having upper and lower flanges and a hub connected between the upper and lower flanges, the molding apparatus comprising:
   (a) an upper mold having a face with a cavity therein for molding the upper flange;
   (b) a lower mold having a face with a disc shaped cavity therein for molding the lower flange, the upper and lower molds being oriented during the molding process so that their faces with the respective cavities are opposed to each other and the lower mold being selectively slidable in a direction perpendicularly away from the face of the upper mold, wherein the cavity in the face of the upper mold is asymmetrically aligned with respect to a hypothetical line across the diameter of the cavity in the face of the lower mold;
   (c) first and second hub molds provided between the upper and lower molds, the first and second hub molds each having an opposing face which has a semicylindrical cavity therein, the first hub mold being slidable in a direction parallel to the face of the upper mold and away from the second hub mold and the second hub mold being stationary relative to the first hub mold; and
   (d) wherein when the upper and lower molds and the first and second hub molds are slid into position against each other, the respective cavities therein are all contiguous whereby a unitary tape cassette reel can be molded.

* * * * *